United States Patent
Rezvani et al.

(10) Patent No.: US 8,090,374 B2
(45) Date of Patent: Jan. 3, 2012

(54) WIRELESS MULTIMEDIA HANDSET

(75) Inventors: Behrooz Rezvani, San Ramon, CA (US); Andrea Goldsmith, Menlo Park, CA (US)

(73) Assignee: Quantenna Communications, Inc, Sunnyvale, CA (US)

( * ) Notice: Subject to any disclaimer, the term of this patent is extended or adjusted under 35 U.S.C. 154(b) by 450 days.

(21) Appl. No.: 11/607,475

(22) Filed: Dec. 1, 2006

(65) Prior Publication Data

US 2007/0167187 A1    Jul. 19, 2007

Related U.S. Application Data

(60) Provisional application No. 60/741,672, filed on Dec. 1, 2005.

(51) Int. Cl.
*H04W 36/00* (2009.01)

(52) U.S. Cl. ...... 455/437; 455/41.2; 455/41.3; 455/436; 455/438; 455/442; 455/443; 455/444; 455/63.1; 455/67.13; 455/550.1; 455/552.1; 455/553.1; 370/331; 370/332; 370/333; 370/334; 370/338

(58) Field of Classification Search .......... 455/436–444, 455/41.2, 41.3, 501, 63.1, 67.13, 550.1, 552.1, 455/553.1; 370/331–334, 338
See application file for complete search history.

(56) References Cited

U.S. PATENT DOCUMENTS

| | | | |
|---|---|---|---|
| 6,295,453 B1 | 9/2001 | Desgagne et al. | |
| 6,423,892 B1 | 7/2002 | Ramaswamy | |
| 6,546,264 B1 | 4/2003 | Kennedy | |
| 6,803,511 B2 | 10/2004 | Mizuno | |
| 6,849,794 B1 | 2/2005 | Lau et al. | |
| 6,859,436 B2 | 2/2005 | Horioka et al. | |
| 6,859,463 B1 * | 2/2005 | Mayor et al. | 370/445 |
| 7,130,282 B2 | 10/2006 | Black | |
| 7,130,608 B2 | 10/2006 | Hollstrom | |
| 7,342,835 B2 * | 3/2008 | Tu et al. | 365/189.05 |
| 7,343,173 B2 * | 3/2008 | Leedom, Jr. | 455/552.1 |
| 7,512,414 B2 | 3/2009 | Jannard et al. | |
| 7,515,929 B2 * | 4/2009 | Ramachandran et al. | 455/550.1 |
| 2001/0049262 A1 | 12/2001 | Lehtonen | |
| 2001/0051996 A1 | 12/2001 | Cooper et al. | |
| 2002/0102950 A1 | 8/2002 | Gore et al. | |
| 2003/0023427 A1 | 1/2003 | Cassin et al. | |

(Continued)

FOREIGN PATENT DOCUMENTS

DE    102004026223 A1 * 11/2005

(Continued)

OTHER PUBLICATIONS

N. Ishikawa, T. Kato, H. Sumino, S. Murakami, J. Hjelm, "Jupiter: Peer-to-Peer Networking Platform over Heterogeneous Networks", Systemics, Cybernetics and Informatics, vol. 4, No. 5, pp. 55-61, Sep./Oct. 2006.*

(Continued)

*Primary Examiner* — Steve D Agosta

(57) ABSTRACT

A wireless multimedia handset can include one or more of wireless system support, a platform to handset features, and multiple features. The multiple features may include, by way of example but not limitation, multiple-antennae, multimedia storage with advanced search capability, a high fidelity sound system, peer-to-peer networking capability, seamless handoff capability, instant hotspot capability, and ultra low power operation such that the handset is capable of operation without recharging by operating solely on solar cells.

1 Claim, 12 Drawing Sheets

U.S. PATENT DOCUMENTS

| | | | |
|---|---|---|---|
| 2004/0125776 A1* | 7/2004 | Haugli et al. | 370/338 |
| 2005/0070225 A1 | 3/2005 | Lee | |
| 2005/0090295 A1 | 4/2005 | Ali et al. | |
| 2005/0094592 A1* | 5/2005 | Schmidt | 370/328 |
| 2005/0123004 A1 | 6/2005 | Lechleider et al. | |
| 2005/0130717 A1 | 6/2005 | Gosieski et al. | |
| 2005/0176466 A1 | 8/2005 | Verloop et al. | |
| 2005/0226166 A1 | 10/2005 | Agrawal et al. | |
| 2005/0239498 A1* | 10/2005 | Dorenbosch et al. | 455/552.1 |
| 2006/0010272 A1* | 1/2006 | Solomon et al. | 710/105 |
| 2006/0084439 A1* | 4/2006 | Joshi et al. | 455/436 |
| 2006/0084469 A1* | 4/2006 | Malone et al. | 455/552.1 |
| 2006/0095331 A1 | 5/2006 | O'Malley et al. | |
| 2006/0103590 A1 | 5/2006 | Divon | |
| 2006/0154699 A1* | 7/2006 | Ko et al. | 455/574 |
| 2006/0166674 A1 | 7/2006 | Bennett et al. | |
| 2006/0193295 A1* | 8/2006 | White et al. | 370/336 |
| 2006/0193296 A1* | 8/2006 | Zhong et al. | 370/338 |
| 2006/0268787 A1 | 11/2006 | Strutt et al. | |
| 2007/0026853 A1* | 2/2007 | Stevens et al. | 455/423 |
| 2007/0211703 A1* | 9/2007 | Gu et al. | 370/356 |
| 2007/0268190 A1* | 11/2007 | Huynh | 343/702 |
| 2008/0037477 A1 | 2/2008 | Axelsson et al. | |
| 2008/0043868 A1* | 2/2008 | Feher | 375/260 |
| 2008/0201138 A1 | 8/2008 | Visser et al. | |
| 2008/0298450 A1* | 12/2008 | Zhang et al. | 375/227 |
| 2009/0061879 A9 | 3/2009 | Gallagher et al. | |
| 2009/0091502 A1* | 4/2009 | Wen et al. | 343/702 |

FOREIGN PATENT DOCUMENTS

JP     2005348367 A * 12/2005

OTHER PUBLICATIONS

"WiMAX: The Business Case", 2004 WiMAX Forum.*
Co-pending U.S. Appl. No. 11/607,815, filed Dec. 1, 2006.
Non-Final Office Action Mailed Apr. 15, 2010 in Co-pending U.S. Appl. No. 11/607,815, filed Dec. 1, 2006.
Final Office Action Mailed Nov. 9, 2009 in Co-pending U.S. Appl. No. 11/607,815, filed Dec. 1, 2006.
Non-Final Office Action Mailed Mar. 31, 2009 in Co-pending U.S. Appl. No. 11/607,815, filed Dec. 1, 2006.
Co-pending U.S. Appl. No. 11/607,431, filed Dec. 1, 2006.
Final Office Action Mailed Sep. 4, 2009 in Co-pending U.S. Appl. No. 11/607,431, filed Dec. 1, 2006.
Non-Final Office Action Mailed Apr. 15, 2009 in Co-pending U.S. Appl. No. 11/607,431, filed Dec. 1, 2006.
Office Action mailed Nov. 24, 2010 from U.S. Appl. No. 11/607,815, filed Dec. 1, 2006.

* cited by examiner

WIRELESS MULTIMEDIA HANDSET

CROSS REFERENCE TO RELATED APPLICATIONS

This application claims priority to U.S. Provisional Application 60/741,672, entitled Multimedia Cell Platform filed Dec. 1, 2005, which is hereby incorporated by reference in its entirety.

BACKGROUND

Wireless handsets are common devices used in communication systems such as cell phones, PDAs, and VoIP phones. Such handsets typically include radio technology to access a given wireless system. For example, a cell phone handset must include wireless technology to access one of the cellular system standards, and a VoIP handset must include wireless technology that can access the Internet.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A wireless multimedia handset can include one or more of wireless system support, a platform to handset features, and multiple features. The wireless system support may include support for one or more of Wifi (802.11a/b/g/n), Wimax, 3G cellular, 2G cellular, GSM-EDGE, radio (e.g. AM/FM/XM), 802.15 (Bluetooth, UWB, and Zigbee) and GPS. The platform to handset features may include providing a platform such that common handset applications (such as a camera capability) as well as third party applications (such as gaming) can access one or more handset features. The multiple features may include, by way of example but not limitation, multiple-antennae, multimedia storage with advanced search capability, a high fidelity sound system, peer-to-peer networking capability, seamless handoff capability, instant hotspot capability, and ultra low power operation such that the handset is capable of operation without recharging by operating solely on solar cells.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
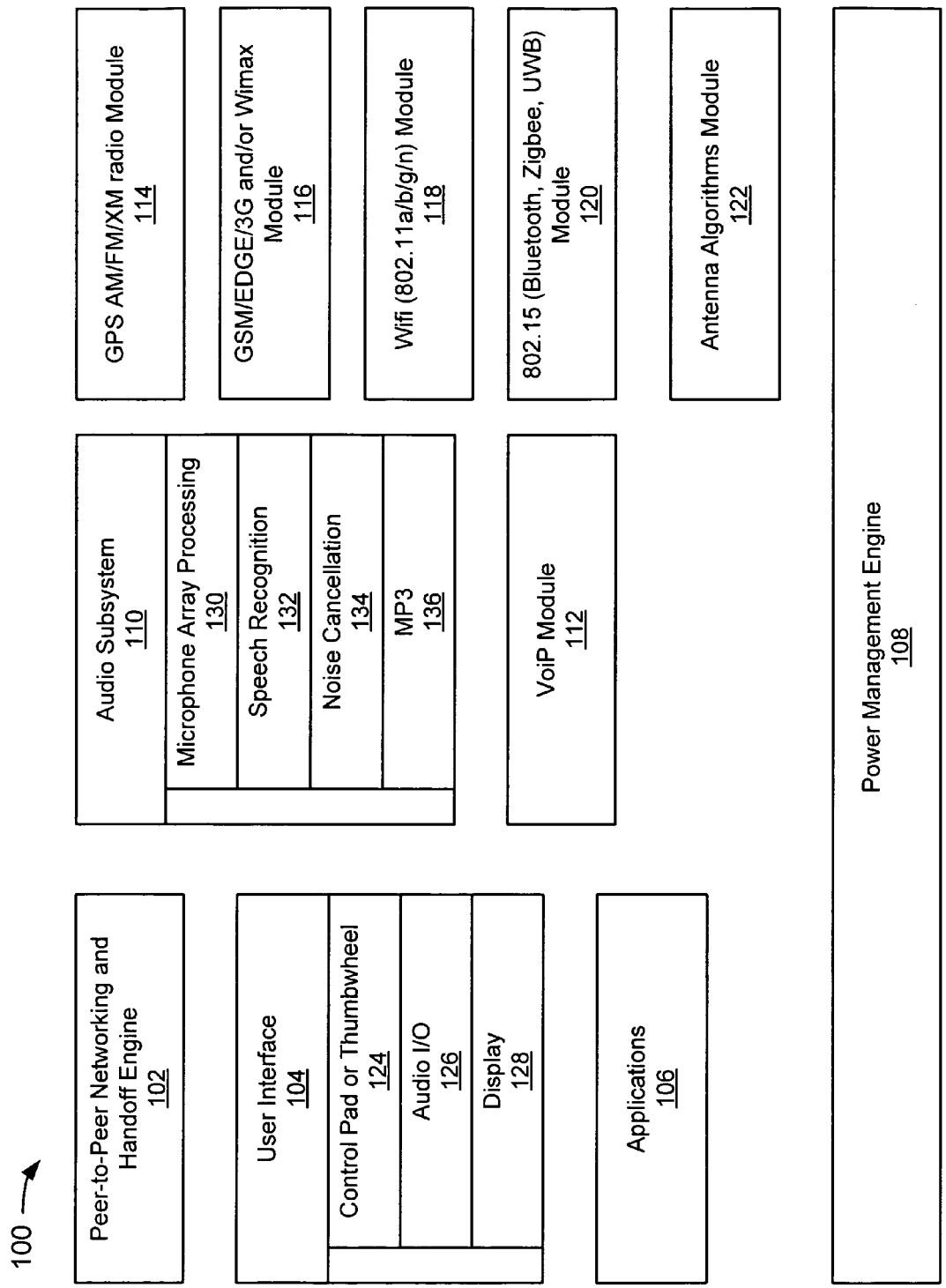
FIG. 1 depicts an example of a multimedia handset device that has ultra-low power requirements.

FIG. 1 depicts an example of a multimedia handset device 100 that has ultra-low power requirements. The device may be used in any applicable known or convenient wireless network, and may be used in conjunction with a wireless server, such as the wireless server described in U.S. application Ser. No. 11/607,815, filed concurrently herewith entitled WIRELESS MEDIA SERVER SYSTEM AND METHOD by Rezvani et al., and which is incorporated by reference. In the example of FIG. 1, the device 100 includes a peer-to-peer networking and handoff engine 102, a user interface 104, applications 106, a power management engine 108, an audio subsystem 110, a VoiP module 112, a GPS AM/FM/XM radio module 114, a GSM/EDGE/3G and/or Wimax module 116, a Wifi (802.11a/b/g/n) module 118, an 802.15 (Bluetooth, Zigbee, UWB) module 120, and an antennae algorithms module 122. The user interface 104 includes a control pad or thumbwheel 124, audio I/O 126, and a display 128. The audio subsystem 110 includes a microphone array processing engine 130, a speech recognition engine 132, a noise cancellation engine 134, and an MP3 engine 136.

In the example of FIG. 1, multiple wireless systems may be integrated into the device, including various cellular phone standards (3G/2G/GSM/Edge), different Wifi standards (802.11a/b/g/n), Wimax, 802.15 (Bluetooth, Zigbee, and/or UWB), and GPS. In an embodiment, the handset 100 has the capability to support Voice over IP (VoIP) through any of the interfaces that allow it to connect to the Internet. In addition, the handset 100 will have a peer-to-peer networking capability that will allow any handset within range of other wireless devices to self-configure with them into a multihop network. In an embodiment, seamless handoff of a given application (e.g. VoIP or music streaming) between different wireless interfaces is also supported.

In general, the handset 100 could be implemented as any device capable of receiving and using content. For example, the handset could include, by way of example but not limitation, a PDA, cell phone, smart phone, etc. Content may include audio files, multimedia files, software applications, or any other content that is capable of playback at a device.

Strictly speaking, any given handset may not be able to play content, though for the purposes of this application, which is regarding handsets, content is assumed to be playable on the handset.

In an embodiment, the handset 100 can include one or more of multiple features such as multimedia storage with advanced search capability, a high fidelity sound system, peer-to-peer networking capability, and ultra low power operation such that the device is capable of operation without recharging by operating solely on solar cells. The handset can also support one or more wireless systems and provide a platform such that common handset applications (such as a camera capability) as well as third party applications (such as gaming) can access the device features.

As used herein, algorithmic descriptions within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture, including that of embedded systems, if applicable.

Figure 2:
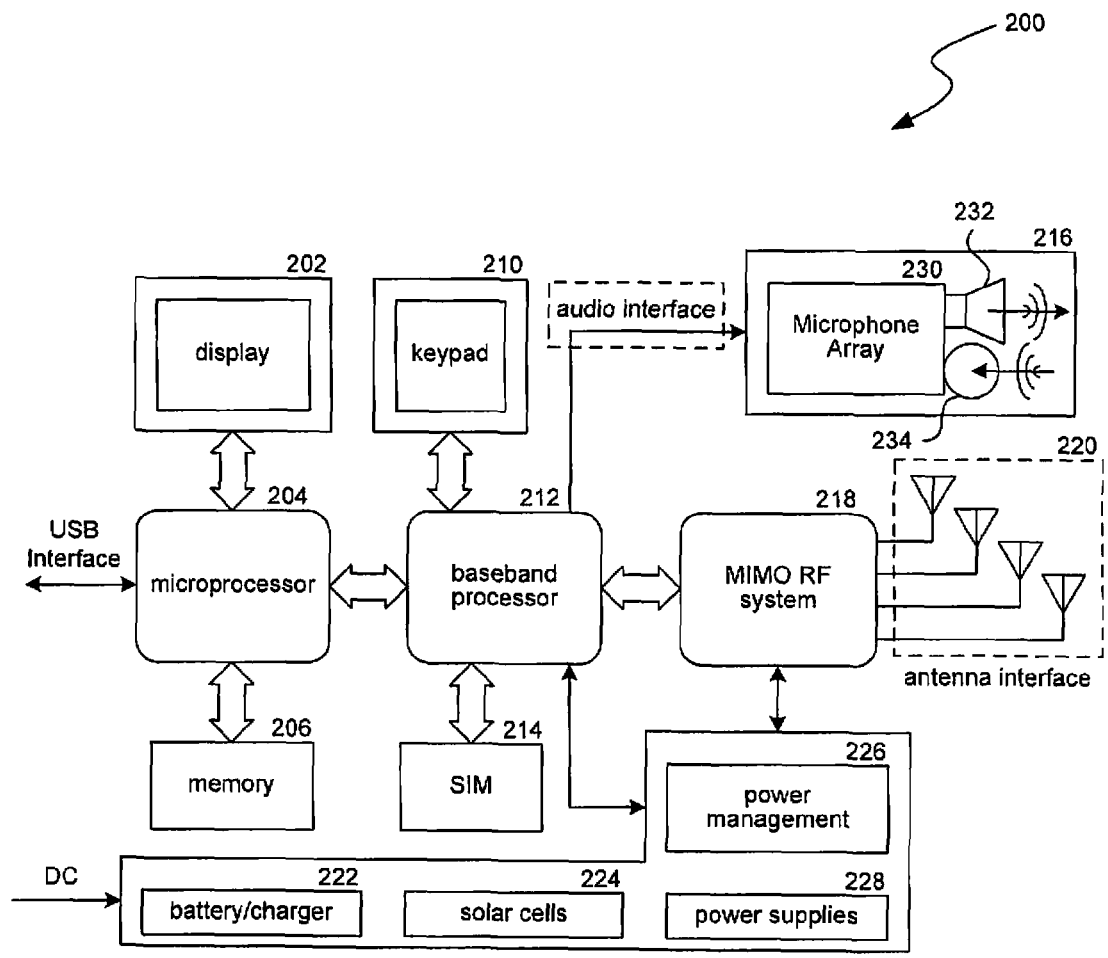
FIG. 2 depicts examples of subsystems of a multimedia handset device.

FIG. 2 depicts examples of subsystems of a multimedia handset device 200. In the example of FIG. 2, the device 200 includes a display 202, a microprocessor 204, memory 206, a power module 208, a keypad 210, a baseband processor 212, a SIM 214, an audio module 216, a multiple-input multiple-output (MIMO) radio frequency (RF) system 218, and an antenna interface 220. The power module 208 includes a battery/charger 222, solar cells 224, a power management engine 226, and power supplies 228. The audio module 216 includes a microphone array 230, a speaker 232, and a receiver 234.

An antenna or array of antennae is used as part of the wireless system or subsystems; signals received from this antenna array are processed by an RF signaling block and a baseband block; power is supplied via DC power and/or through solar cell recharging; the device has memory and a USB interface; the user interface is via a display, keypad (or thumbwheel), and audio input/output from a microphone array.

Figure 3:
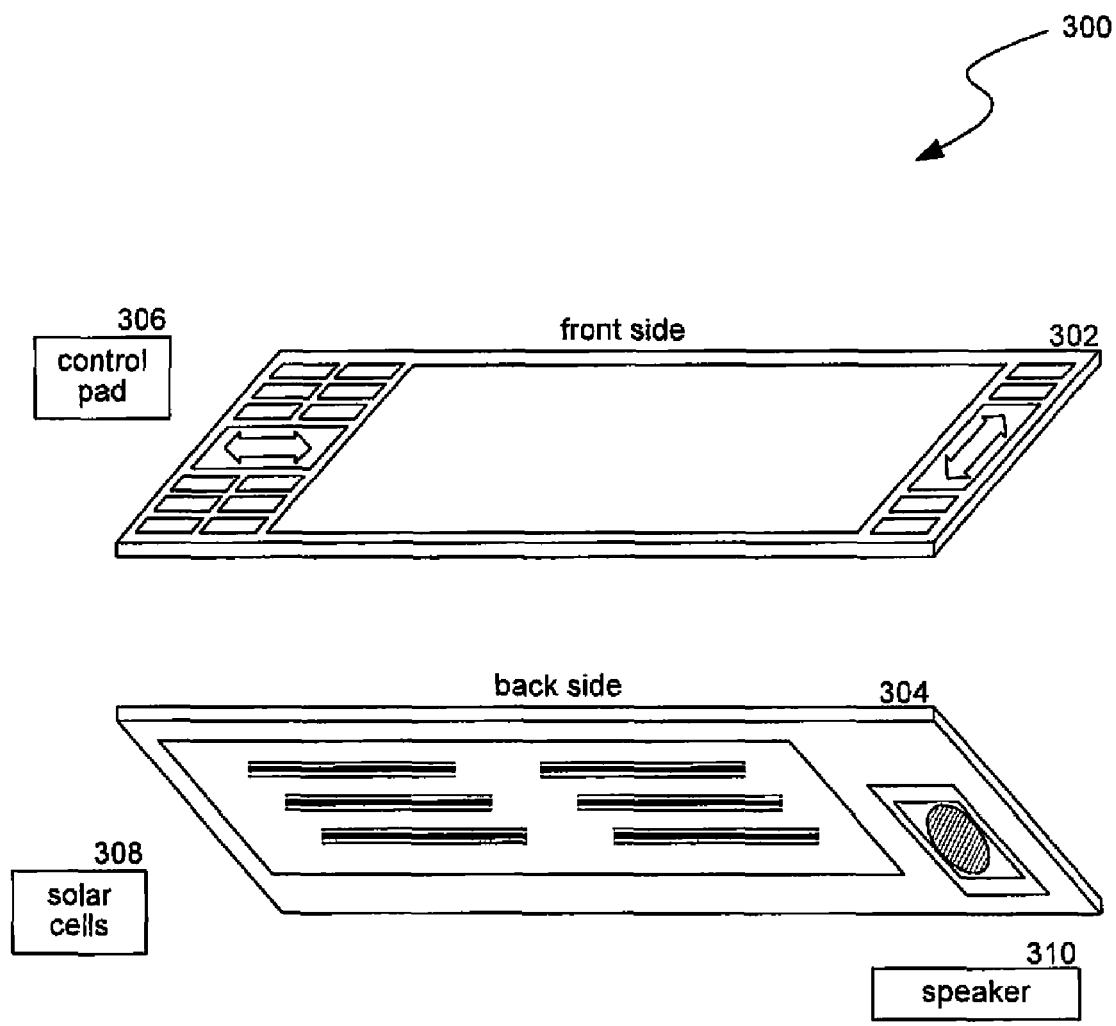
FIG. 3 depicts a conceptual diagram of a handset.

FIG. 3 depicts a conceptual diagram of a handset 300. A front side 302 of the handset 300 includes a control pad 306. A back side 304 of the handset 300 includes solar cells 308 and a speaker 310. The solar cells can charge the battery from ambient light as well as solar light. Inside the device are the electronics for supporting the handset features (e.g. RF, analog, mixed-signal, and digital electronic circuitry, microprocessors, antennas, etc.). The user interface to the device may be through speech recognition of commands, through a control pad, and/or through another type of interface such as a thumbwheel for menu navigation.

Figure 4:
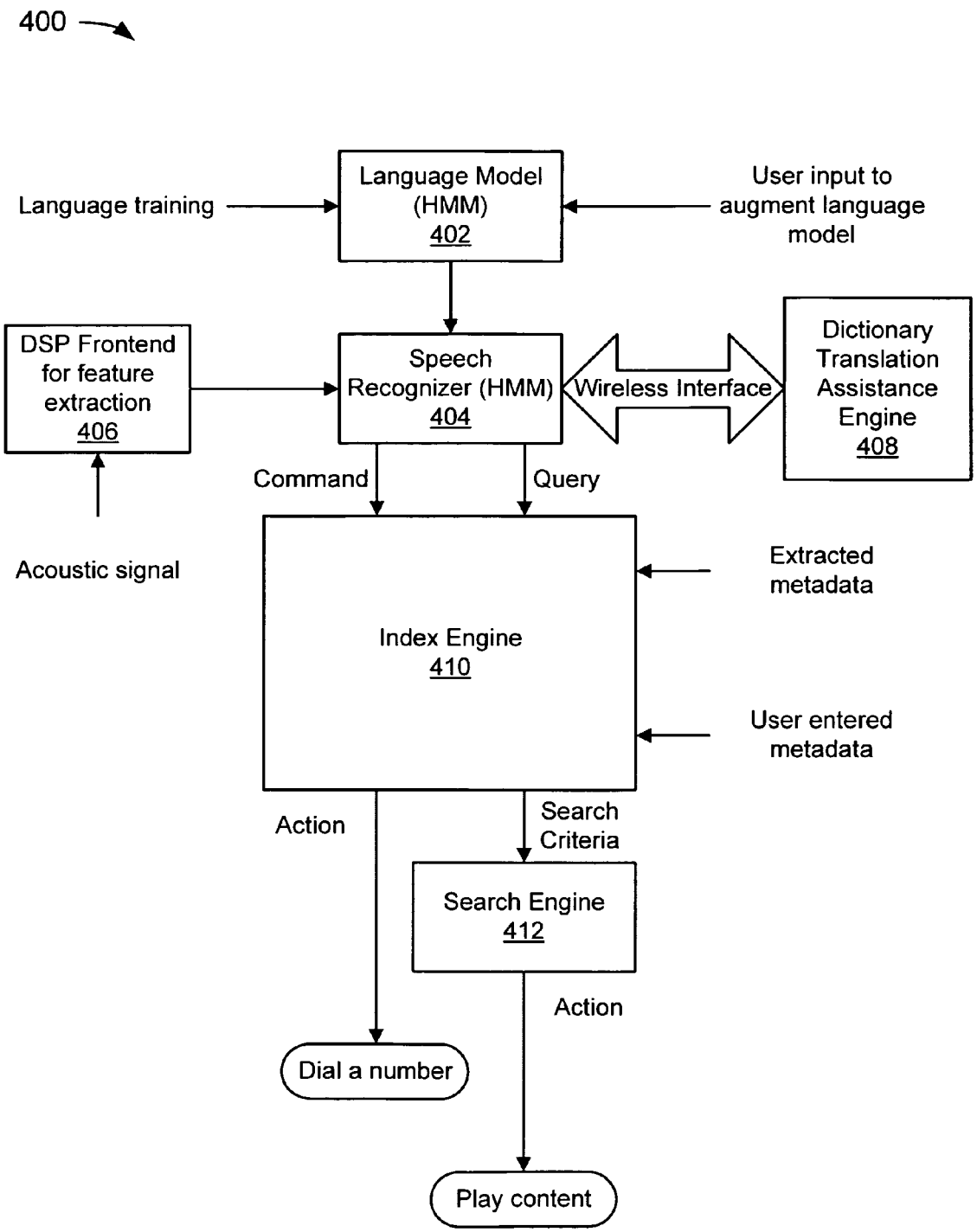
FIG. 4 depicts a flowchart of an example of a method for operating a handset with speech recognition capabilities.

FIG. 4 depicts an example of a system 400 for providing speech recognition capabilities to a handset. In the example of FIG. 4, the system 400 includes a language model 402. The language may include, by way of example but not limitation, a set of hidden Markov models (HMMs) for speech data. The language model may be enhanced through language training. For example, a one-time-per-language training could be used for 500 common words. Any known or convenient technique may be implemented for the purposes of initial (or later) language training. In addition to language training, user input can be used to augment the language model 402. For example, a user could enter specific vocabulary, such as proper names, either one at a time, or captured as a user enters commands or speaks to a voice application.

In the example of FIG. 4, the system 400 includes a speech recognizer (HMM) 404. The speech recognizer may embody on a computer-readable medium a speech recognition algorithm that uses the HMMs. The speech recognizer 404 will take as input a user's speech. In an embodiment, the speech recognizer 404 is designed and/or configured such that wireless interfaces and/or peer-to-peer networking capability can be used to provide additional input to the algorithm. Specifically, the speech recognizer 404 has the ability to use any of the available wireless interfaces and/or the peer-to-peer network to connect to another device such as a laptop, computer, or another handset to expand the vocabulary base, provide translation assistance, or access a more powerful speech recognition algorithm or set of HMMs.

In the example of FIG. 4, the speech recognizer 404 is coupled to a DSP frontend for feature extraction 406, which receives an acoustic signal as input. Noise cancellation and beamforming algorithms can be designed relative to the speech recognition algorithm such that the feature extraction of the input speech is optimized (note that noise cancellation/beamforming algorithms designed independent of the speech recognition algorithms can degrade speech recognition performance by introducing undesired speech artifacts).

In the example of FIG. 4, the speech recognizer 404 is coupled to a dictionary translation assistance engine 408 via a wireless interface. Since a handset may not have as much power or storage as a laptop, if a laptop is nearby, it can be used to provide translation assistance. Any appropriately configured known or convenient device capable of communicating with the speech recognizer 404 should be able to provide dictionary translation assistance.

In the example of FIG. 4, the speech recognizer 404 may categorize recognized speech as either a command (e.g. dial a specific number) or a query (e.g. look for a particular content file). Both commands are provided to an index engine 410. The index engine 410 may also make use of metadata, such as metadata that is extracted from, by way of example but not limitation, music files, video files, game files, contact info, and the like, or metadata that is entered by a user, such as personal photos. For commands the index engine 410 may or may not use the metadata to determine an appropriate course of action, then take the appropriate action to satisfy the command. For queries the index engine 410 may or may not use the metadata to generate search criteria that is (hopefully) sufficient to enable a search engine 412 to locate a desired content file, then take the appropriate action (such as playing the content file).

Figure 5:
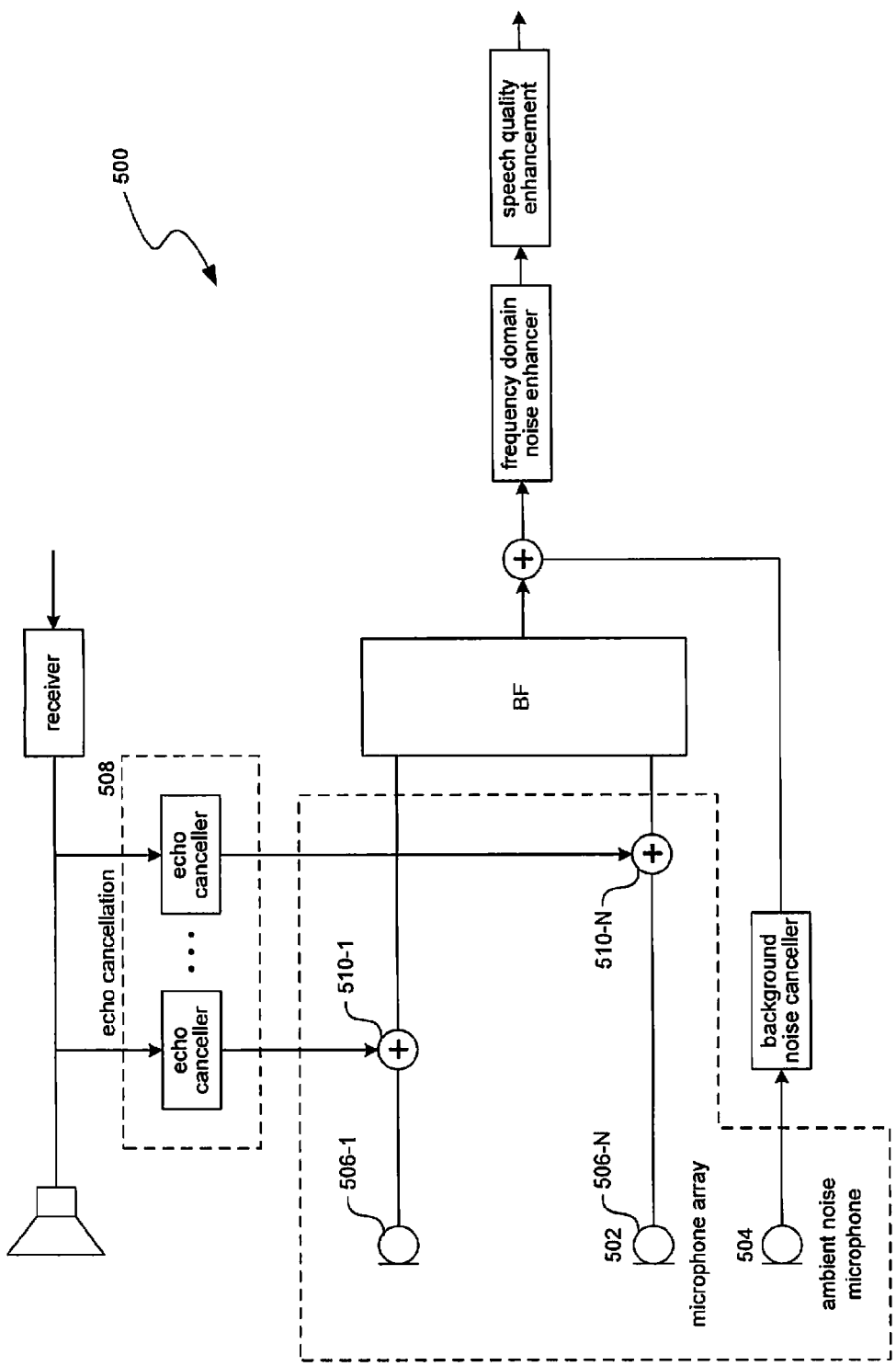
FIG. 5 depicts an example of a microphone array system 500 for a handset.
Figure 6:
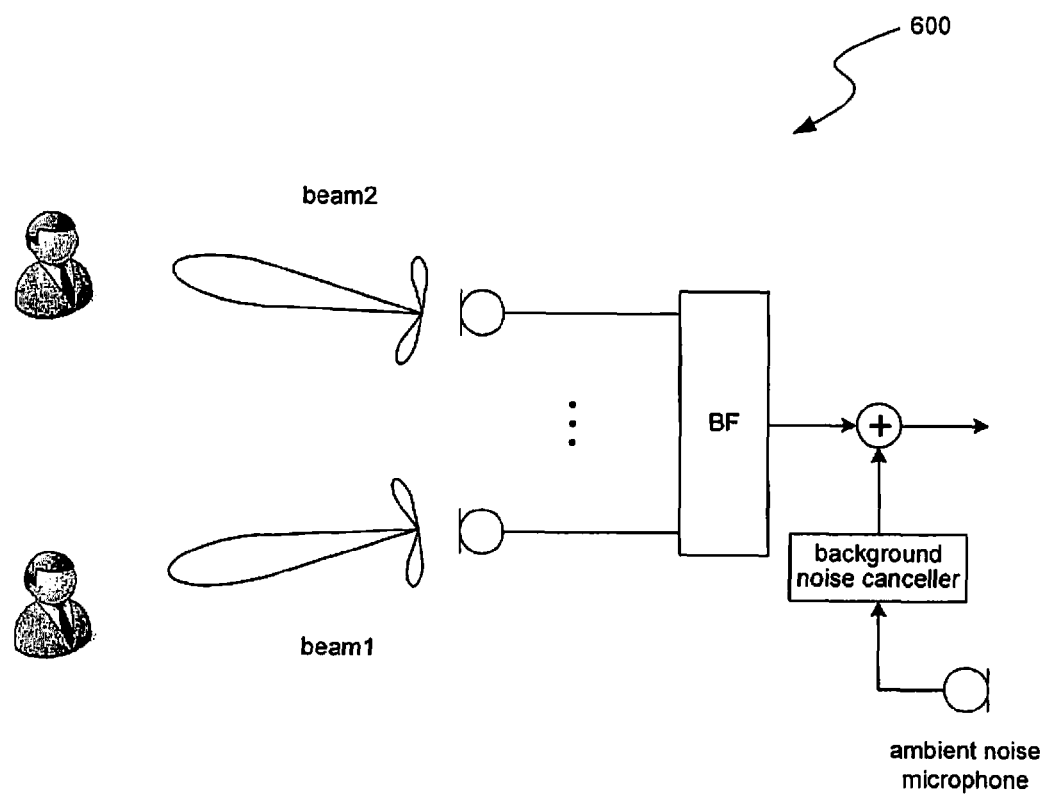
FIG. 6 depicts an example of steering a microphone array towards a person that is speaking or towards multiple people speaking.

FIG. 5 depicts an example of a microphone array system 500 for a handset. The handset will feature a high fidelity sound system for picking up voice signals by utilizing a microphone array coupled with a noise cancellation algorithm embodied in a computer-readable medium. In an embodiment, a microphone array 502 includes one ambient noise microphone 504 located on a part of the handset optimized for it to pick up background ambient noise, as well as additional microphone elements 506-1 to 506-N (referred to collectively as microphone elements 506) in different locations on the handset. Echo cancellation 508 is used for signals transmitted from the handset to remove echo effects. In an embodiment, antenna elements 510-1 to 510-N (referred to collectively as antenna elements 510) in the microphone array 502 have weights assigned to each antenna input. Different algorithms can be used to determine the weights, depending on the performance criteria, the number of antenna elements available and their nature, and the algorithm complexity. For example, the weights may be used to minimize ambient noise, to make the antenna array gain independent of frequency, to minimize the expected mean square distortion or error of the signal, or to steer the direction of the microphone array towards a person that is speaking or towards multiple people speaking, as shown in FIG. 6.

In an embodiment, the handset includes nonvolatile storage for multimedia data files, for example through a Flash RAM. There are many methods by which the multimedia data files may be loaded into the handset memory, for example via a wireless connection to the Internet, via a cellular telephone connection, via a satellite (e.g. XM or Sirius) or AM/FM radio receiver, via a USB high-speed data port, or via a wired or wireless connection to another device (e.g. a wireless connection to a computer, music server, video server, or digital camera). The library may be partitioned by media type, for example there may be one partition of the memory for photos, one for video clips, one for music, one for phone numbers, etc. File storage will include the capability to add "tags" to files. The tagging is done to facilitate searching based on tags that the user selects for each media type. For example, a music file might have a tag or tags such as file title, song title, artist, keywords, genre, album name, music sample or clip, etc. A video file might have a tag such as file title, video title, date, subject, location, artist, etc. A photo file might have a tag such as picture title, date, subject, location, etc.

In an embodiment, the handset includes intelligent software for searching multimedia files stored on the handset based on multiple search criteria and by the type of file of interest. Alternatively, a user can set up certain tags for all pictures taken under the given tagging criterion. For example, when using a cell phone with a camera, the user may define a certain tag or set of tags for all pictures being taken (e.g. "kids", "spouse", "vacation to Europe 2006", etc.). The user need only enter this tag or set of tags once, and then change the tag or tags when a change is desired. When the picture is taken, the image will be stored in the memory of the handset with the associated tags attached to the file. Then, after this tagging process is set up, the user can tag all pictures without any additional manual inputs (e.g. typing or thumbwheel inputs). This is particularly useful for a handset since it is relatively hard to do manual entry for each new file on a small-sized device. The same concept can also used for tagging and searching for music on the handset, where a set of tags can be assigned to all music downloaded.

In an embodiment, a search engine (SE) may implement a search algorithm that has been embodied in a computer-readable medium. The algorithm may include a multistep process to locate a file or set of files of interest. This generalized search engine may re-use a number of similar functions for different kind of searches such as speech recognition, image recognition, and music recognition. The SE interacts with the user through the user interface, which for example can be a control pad, thumbwheel, or via voice. In the case of voice commands, the handset synthesizes a voice signal to query the user, and the user's voice commands are processed by a voice recognition engine and then sent to the SE. The noise cancellation and beamforming capabilities of the microphone array, shown in FIG. 5, can be combined with a speech recognition engine to improve its performance.

Figure 7:
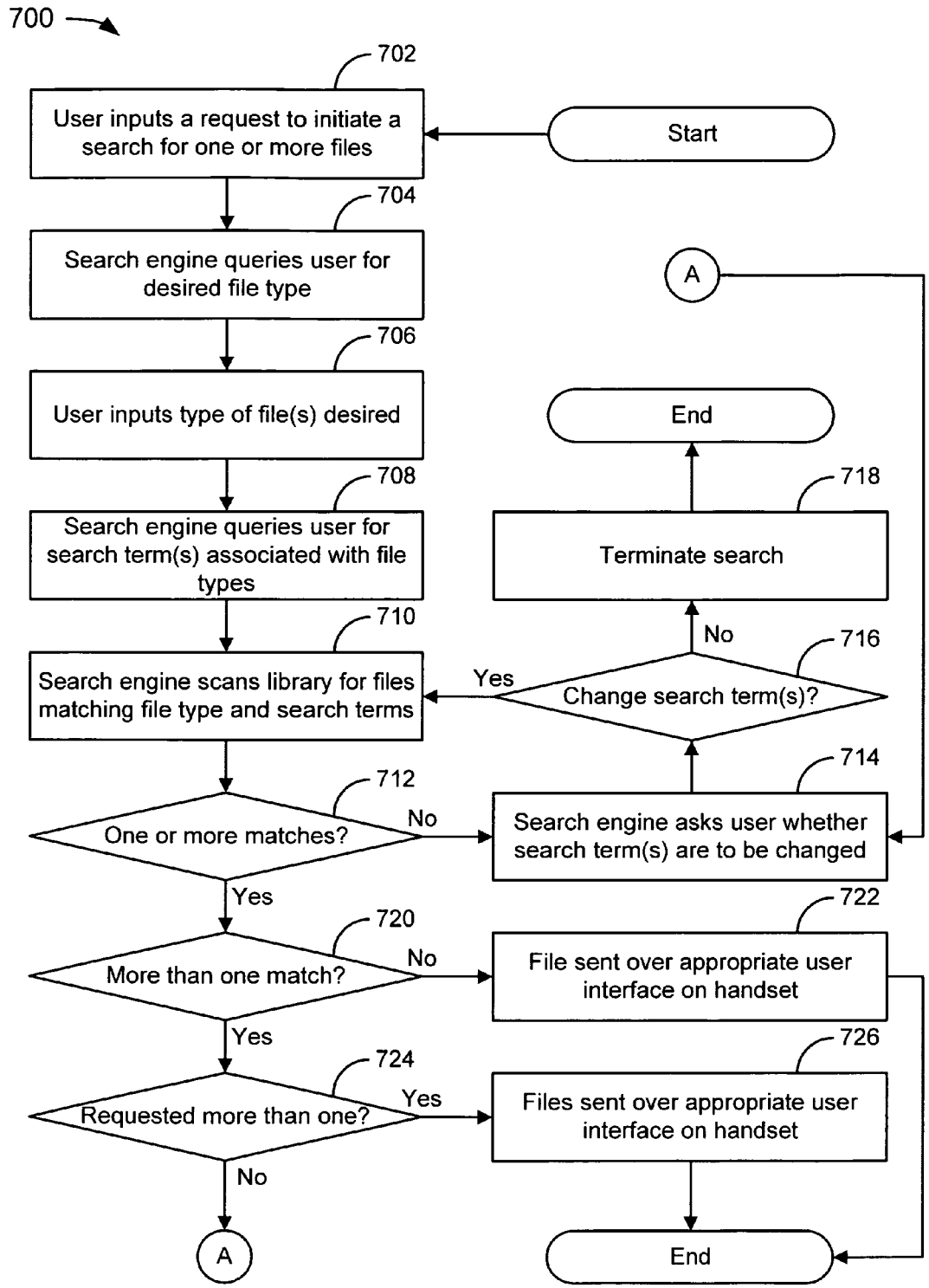
FIG. 7 depicts a flowchart of an example of a method for locating a file or set of files.

FIG. 7 depicts a flowchart 700 of an example of a method for locating a file or set of files. This method and other methods are depicted as serially arranged modules. However, modules of the methods may be reordered, or arranged for parallel execution as appropriate. In the example of FIG. 7, a user first initiates a search by sending a command to the SE. The SE then queries the user as to what type of media is desired from a given list of types, which may include video, music, photos, etc. Determining the type of media requested will narrow the search space to a particular partition of the multimedia storage library. Once the file type is identified, the SE will have a set of search criteria associated with that type. The search engine can utilize the tags users input to label the files as well as other data associated with the files. For example, a search for a music file may be by user tag or tag fragment, file title, song title, album name, artist name, keywords, lyrics, a hummed tune, popularity, similarity to other music, genre, etc.

In the example of FIG. 7, the flowchart 700 begins at module 702 where a user inputs a request to initiate a search for one or more files. In the example of FIG. 7, the flowchart 700 continues to module 704 where a search engine queries the user for a desired file type. In the example of FIG. 7, the flowchart 700 continues to module 706 where the user inputs the type of file(s) desired. In the example of FIG. 7, the flowchart 700 continues to module 708 where the search engine queries the user for search term(s) associated with the desired file type(s). In the example of FIG. 7, the flowchart 700 continues to module 710 where the search engine scans a library for files matching the file type(s) and search term(s).

In the example of FIG. 7, the flowchart 700 continues to decision point 712 where it is determined whether there are more than one matches. If not (712-N), then the flowchart 700 continues to module 714 where the search engine asks the user whether the search term(s) are to be changed. In the example of FIG. 7, the flowchart 700 continues to decision point 716 where it is determined whether the search term(s) is/are to be changed. If so (716-Y), then the flowchart 700 continues from module 710 as described previously. If not (716-N), then the flowchart 700 continues to module 718 where the search terminates and the flowchart 700 ends.

Returning once again to decision point 712, if it is determined that there are more than one matches (712-Y), then the flowchart 700 continues to decision point 720 where it is determined whether there is more than one match. If not (720-N), then the flowchart 700 continues to module 722 where the matching file is sent over an appropriate user interface on the handset and the flowchart 700 ends. If, on the other hand, it is determined that there are more than one matches (720-Y), then the flowchart 700 continues to decision point 724 where it is determined whether the user requested more than one file. If so (724-Y), then the flowchart 700 continues to module 726 where the matching files are sent over an appropriate user interface on the handset, and the flowchart ends. If not (724-N), then the flowchart 700 continues from module 714 as described previously.

Figure 8:
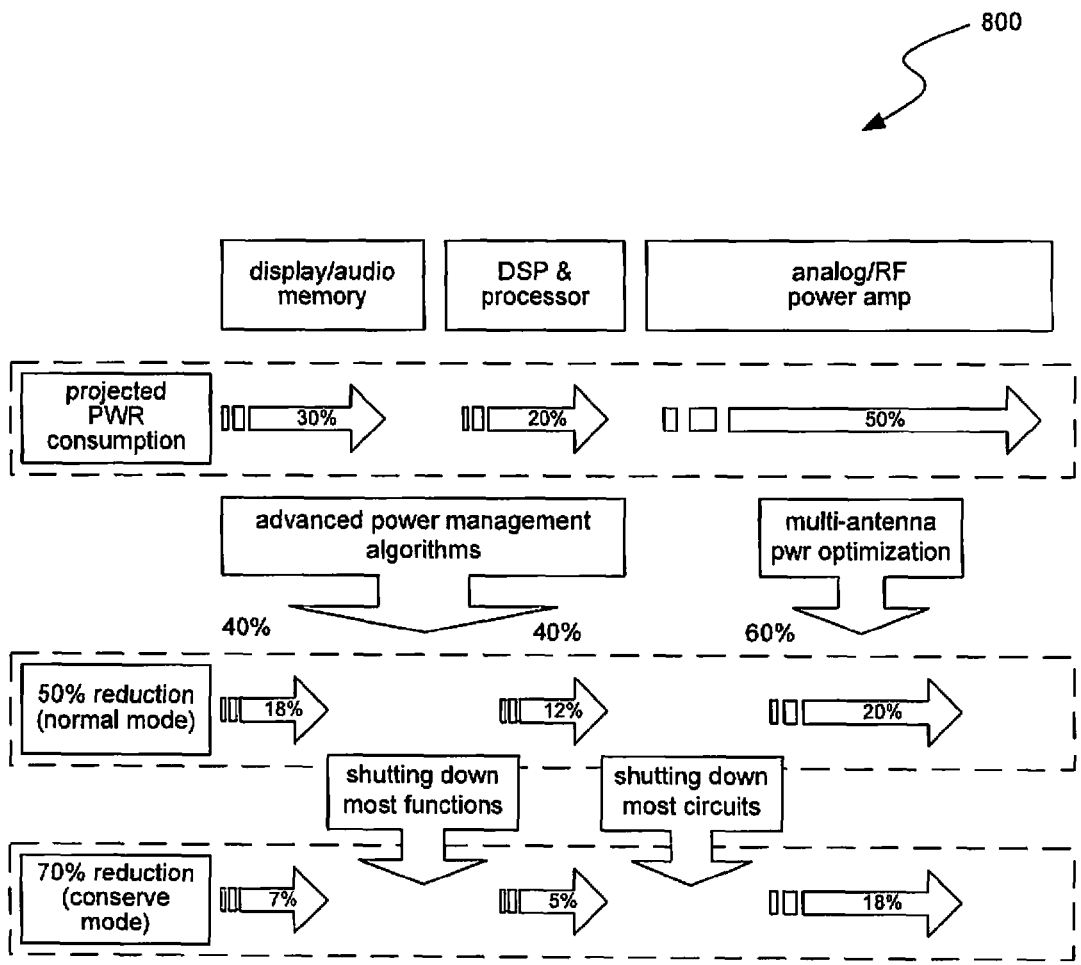
FIG. 8 depicts an example of details of a power management algorithm embodied in a computer-readable medium.

As shown in the example of FIG. 2, the handset has a power management algorithm, embodied in a computer-readable medium, that minimizes power consumption based on the usage of the handset. FIG. 8 depicts an example of details of a power management algorithm embodied in a computer-readable medium. As shown in FIG. 8, components of the power management algorithm include managing power consumption associated with display, audio, memory, DSP, and/or processors to be minimized while supporting the applications in use; utilizing multiple antennas (MIMO) in the most efficient way to minimize the power consumption required for wireless transmission; shutting down certain nonessential device functionality, and turning off nonessential device circuitry.

In an embodiment, the handset is designed such that a certain application or set of applications that require relatively low power can be maintained for an indefinite time period under solar power alone, e.g., solar cells embedded in the device and aggressive power management will allow the device to support the given application(s) indefinitely without recharging by shutting down all nonessential functions except those associated with the specific application or applications. For example, the device may operate indefinitely without recharging in Wifi-only mode by shutting down all functions in the device (e.g. certain display features, memory access, audio processing, noise cancellation, and search algorithms) not associated with maintaining a low-rate Wifi connection to the Internet through one or more interfaces that support this connection (e.g. 802.11a/b/g/n); in voice-only mode the device may operate indefinitely without recharging by shutting down all functionality of the device not associated with making a voice call (e.g. certain display features, memory access, audio processing, noise cancellation, and search algorithms) through one or more interfaces that support such calls (e.g. 2G, 3G, GSM, VoIP over Wifi), etc.

Figure 9:
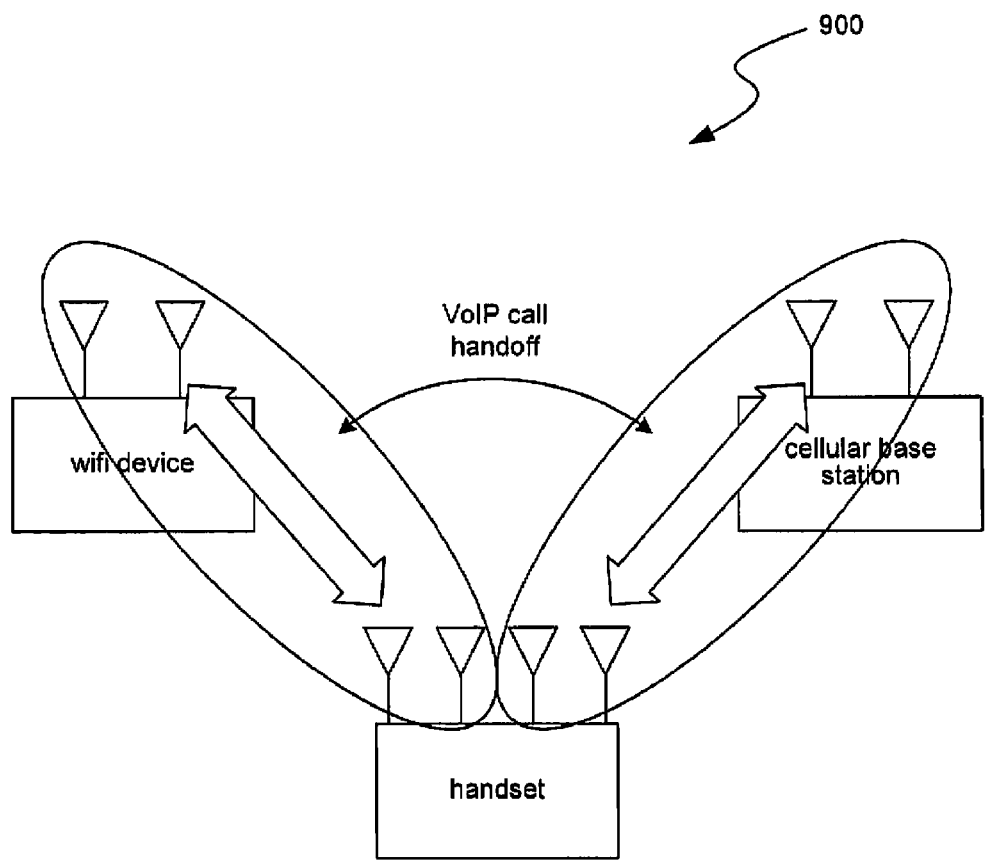
FIG. 9 depicts a conceptual diagram of seamless handoff of a VoIP call between a cellular and Wifi system.

In an embodiment, the handset supports simultaneous operation on the different wireless interfaces, i.e. simultaneous operation on at least two systems that may include Wifi (802.11a/b/g/n), Wimax, 3G cellular, 2G cellular, GSM-EDGE, radio (e.g. AM/FM/XM), 802.15 (Bluetooth, UWB, and Zigbee) and GPS. These systems often operate at different frequencies. Simultaneous operation over the same or different frequencies can be done, for example, by using some set of antennas for one system and using another set of antennas for another system. This is illustrated in FIG. 9 for simultaneous operation over a cellular system and a Wifi system. Another mechanism to support this simultaneous multifrequency operation is time division. In addition to simultaneous operation, the handset can support seamless handoff between two systems. For example, the handset could switch a VoIP call from a wide-area wireless network such as Wimax or 3G to a local area network such as Wifi. FIG. 9 depicts a conceptual diagram of seamless handoff of a VoIP call between a cellular and Wifi system.

Figure 10:
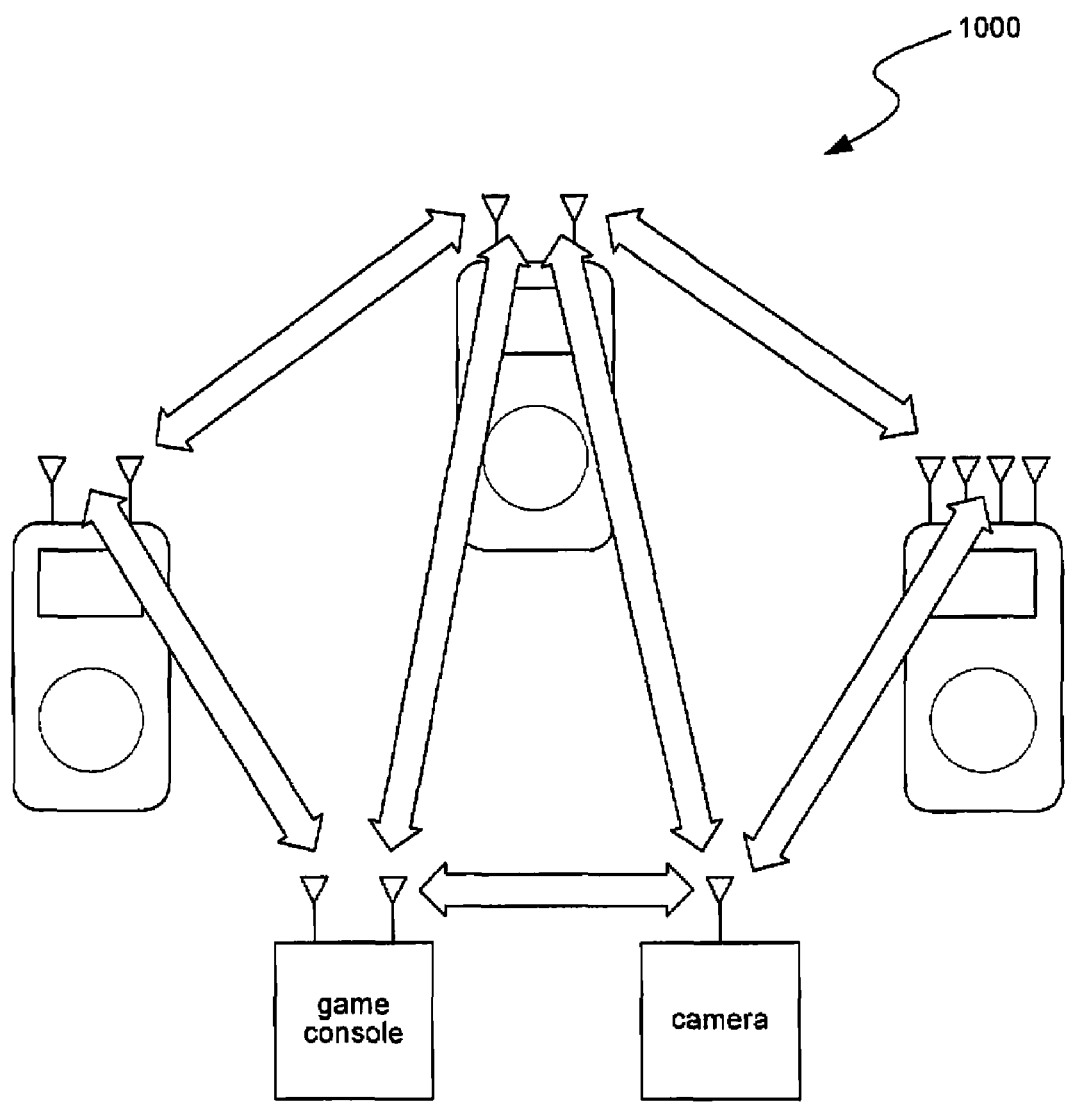
FIG. 10 depicts peer-to-peer networking to establish direct or multihop connections with other wireless devices for real-time interaction and file exchange.

FIG. 10 depicts peer-to-peer networking to establish direct or multihop connections with other wireless devices for real-time interaction and file exchange. A peer-to-peer networking protocol can make use of all wireless interfaces that can establish a direct connection with other wireless devices. For example, it could use an 802.11a/b/g/n interface operating in peer-to-peer mode, an 802.15 interface, a proprietary peer-to-peer radio interface, and/or an infrared communication link. The user may select to establish peer-to-peer networks on all available interfaces simultaneously, on a subset of interfaces, or on a single interface based on a prioritized list of possible interfaces.

Alternatively, a peer-to-peer network may be established based on a list or set of lists of specific devices or user IDs that the user wishes to interact with. For example, a user may set up a list of gaming partners (or multiple lists, each associated with a different game or partner preferences), such that whenever a device or user associated with one of those partners is in range of the handset, the handset will establish a peer-to-peer connection with it on any interface that the two devices have in common. The lists could be exchanged between devices to establish a union of lists, so that if User A and User B are connected, and User C is on User A's gaming list but comes in range of User B, then User C will join the peer-to-peer gaming network.

There are two main components to the peer-to-peer networking protocol: neighbor discovery and routing. In neighbor discovery a handset determines which other devices it can establish a direct connection with. This may be done, for example, by setting aside a given control channel for neighbor discovery, where nodes that are already in the peer-to-peer network listen on the control channel for new nodes beginning the process of neighbor discovery.

Figure 11:
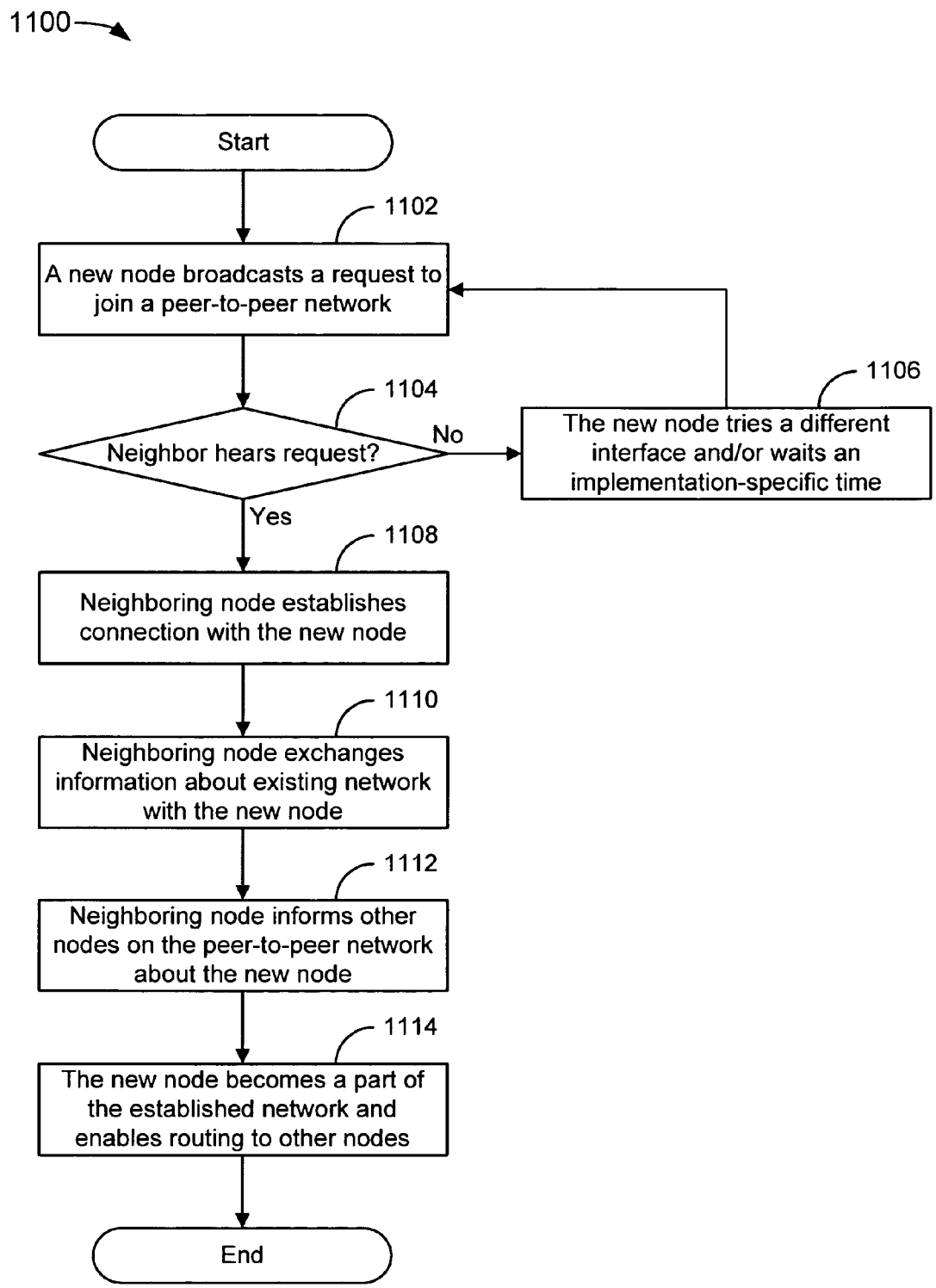
FIG. 11 depicts a flowchart of an example of a method for neighbor discovery and joining a peer-to-peer network.

FIG. 11 depicts a flowchart 1100 of an example of a method for neighbor discovery and joining a peer-to-peer network. When a node first begins the process of neighbor discovery, it broadcasts a beacon identifying itself over a control channel set up for this purpose. Established nodes on the network periodically listen on the control channel for new nodes. If an established node on the network hears a broadcast beacon, it will establish a connection with the broadcasting node. The existing node will exchange information with the new node about the existing network to which it belongs, e.g. it may exchange the routing table it has for other nodes in the network with the new node. The neighboring node will also inform other nodes on the network about the existence of the new node, and that it can be reached via the neighboring node, e.g. by exchanging updated routing tables with the other nodes. At that point the new node becomes part of the network and activates the routing protocol to communicate with all nodes in the network.

In the example of FIG. 11, the flowchart 1100 starts at module 1102 where a new node broadcasts a request to join a peer-to-peer network. In the example of FIG. 11, the flowchart 1100 continues to decision point 1104 where it is determined whether a neighboring node hears the request to join. If it is determined that the request is not heard (1104-N), then the flowchart continues to module 1106 where the new node tries a different interface and/or waits for an implementation-specific amount of time before trying again, then the flowchart 1100 continues from 1102 as described previously. If, on the other hand, it is determined that a neighboring node hears the request to join (1104-Y), then the flowchart 1100 continues to module 1108, where a neighboring node establishes a connection with the new node.

In the example of FIG. 11, the flowchart 1100 continues to module 1110 where the neighboring node exchanges information about the existing network with the new node. For example, the neighboring node may give the new node some or all of its routing table. In the example of FIG. 11, the flowchart 1100 continues to module 1112 where the neighboring node informs other nodes on the peer-to-peer network about the new node. In the example of FIG. 11, the flowchart 1100 continues to module 1114 where the new node becomes a part of the established network and enables routing to other nodes of the peer-to-peer network.

In an embodiment, a routing protocol will take advantage of link layer flexibility in establishing and utilizing single and multihop routes between nodes with the best possible end-to-end performance. The routing protocol will typically be based on least-cost end-to-end routing by assigning costs for each link used in an end-to-end route and computing the total cost based on these link costs. The cost function is designed to optimize end-to-end performance. For example, it may take into account the data rates, throughput, and/or delay associated with a given link in coming up with a cost of using that link. It may also adjust link layer parameters such as constellation size, code rate, transmit power, use of multiple antennas, etc., to reduce the cost of a link and thereby the cost of an end-to-end route.

In addition, for nodes with multiple antennas, multiple independent paths can be established between these nodes, and these independent paths can comprise separate links over which a link cost is computed. The routing protocol can also include multiple priorities associated with routing of each data packet depending on data priority, delay constraints, user priority, etc.

When the wireless interfaces in the handset include wide-area wireless nework technology such as cellular (e.g. GSM, EDGE, 3G) or Wimax as well as a local-area wireless network technology such as Wifi (e.g. 802.11a/b/g/n), the handset will have the capability to act as an instant hotspot by serving as an access point for the Wifi network to connect it to the wide-area wireless network backbone. Specifically, it can use one interface to connect to the wide-area network and another interface to connect to the local area network in the capacity of an access point for other Wifi devices. The wide-area network and local-area network will typically operate on different frequencies. The handset therefore must support simultaneous operation over different frequencies.

Figure 12:
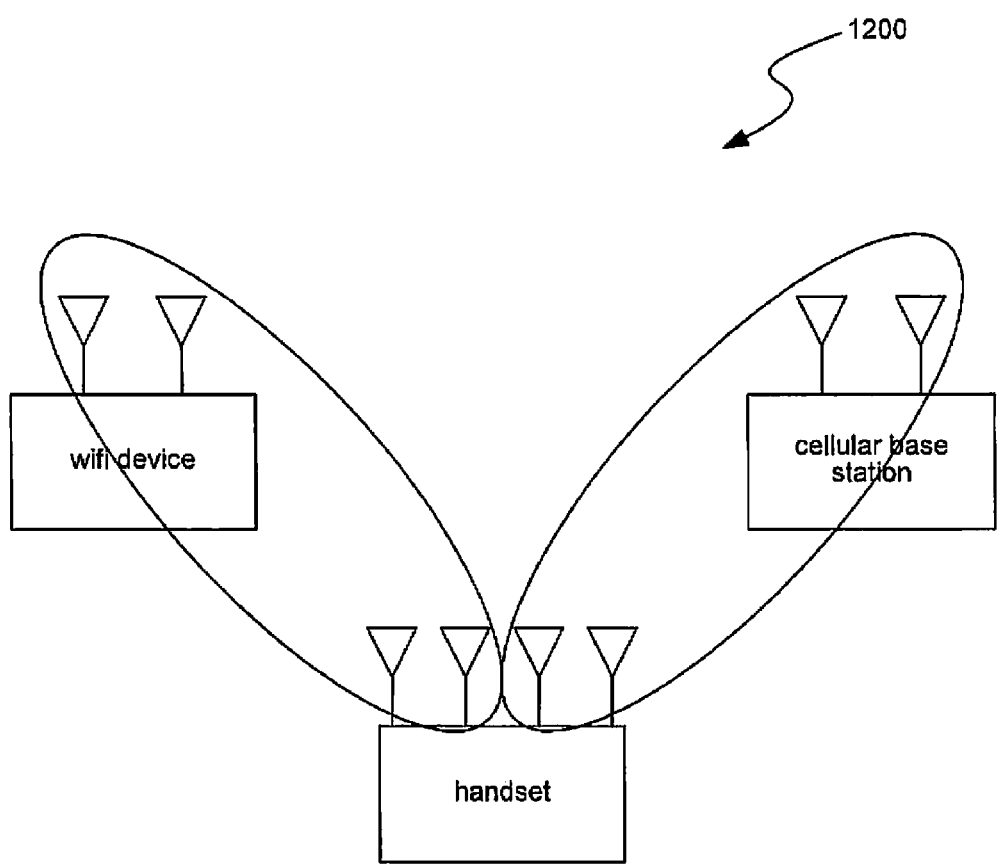
FIG. 12 depicts a system that includes simultaneous operation over different frequencies.

FIG. 12 depicts a system 1200 that includes simultaneous operation over the same or different frequencies. This can be accomplished by, for example, using some set of antennas for the wide-area network and using another set of antennas for the local-area network. In the example of FIG. 12, the wide-area network is cellular and the local-area network is Wifi. Another mechanism to support simultaneous multifrequency operation is to have a multiband radio combined with multiband antennas. Yet another mechanism that may be used to support simultaneous operation is time-division.

The handset may be developed as an open architecture so that third party applications can utilize the handset capabilities of high-fidelity sound, large memory, advanced searching capabilities, peer-to-peer networking, and multiple wireless connections. The architecture of the handset may enable this by providing the appropriate subsystem and software interfaces.

As used herein, the term "embodiment" means an embodiment that serves to illustrate by way of example but not limitation.

It may be noted that in examples of content that include only music files, the music files are streamed. However, in alternative embodiments, music files could be downloaded and then played. The advantage of streaming is that a playback device can begin to play a music file before the music file has been received in its entirety. The same is true for multimedia streaming and software streaming.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A wireless handset device comprising:
a multiple-input multiple-output (MIMO) radio frequency (RF) system including a multi-band radio and a plurality of multi-band antennae, wherein simultaneous operation with a first wireless system and a second wireless system at the same frequency is supported, and further wherein simultaneous operation over different frequencies is supported by the multi-band radio;
a plurality of wireless interfaces, wherein, in operation, a first one or more of the wireless interfaces are used to operate in a first wireless system and a second one or more of the wireless interfaces are used to operate in a second wireless system, and wherein operation in the first wireless system and the second wireless system is simultaneous by using a first subset of the plurality of multi-band antennae for the first wireless system and a second subset of the plurality of multi-band antennae for the second wireless system; and wherein further the plurality of wireless interfaces include a wide-area wireless interface and local-area wireless interface, enabling the device to act as an instant hotspot by serving as an access point for local-area wireless network to connect to a wide-area wireless network by using the first subset of multi-band antennae for the local-area wireless network and the second subset of multi-band antennae for the wide-area wireless network;
a peer-to-peer networking engine coupled to the wireless interfaces, wherein, in operation, the peer-to peer networking engine uses neighbor discovery and routing to connect to a peer-to-peer wireless network, and wherein the peer-to-peer wireless network is established based on a list of specific devices with which a user wishes to interact;
a handoff engine coupled to the wireless interfaces, wherein, in operation, the handoff engine accomplishes seamless wireless handoffs from the first wireless system to the second wireless system by maintaining connections with both the first wireless system and the second wireless system until handoff is complete, wherein the handoff engine facilitates seamless handoff of a voice over IP (VoIP) application between the first wireless system and the second wireless system; and
a power management engine to reduce power consumption in the wireless handset by using a power management algorithm, and multi-antennae power optimization, and shutting down non-essential functions and circuits: and
an array of microphones, wherein a weight is assigned to each of a plurality of microphone inputs, depending on one or more performance criteria; and wherein a noise cancellation operation is performed based on the weights.

* * * * *